Jan. 1, 1952  A. G. HERRESHOFF  2,581,326
PISTON
Filed March 29, 1949
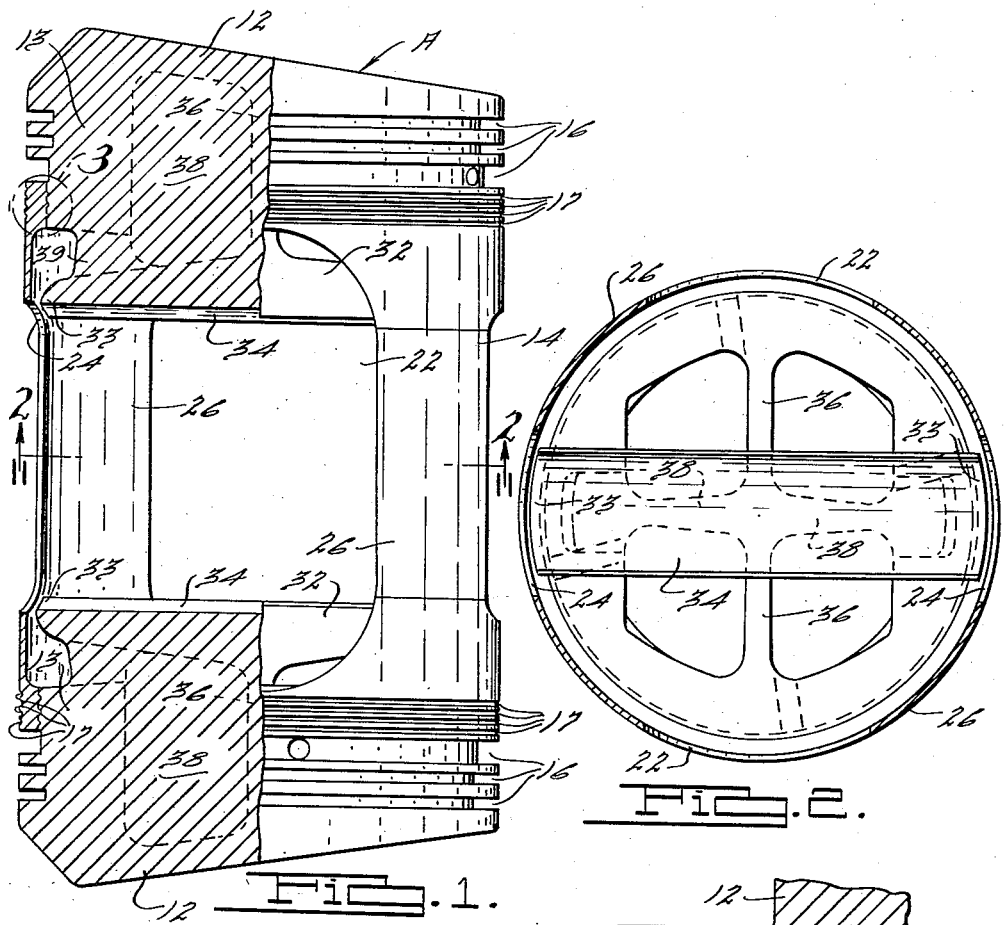
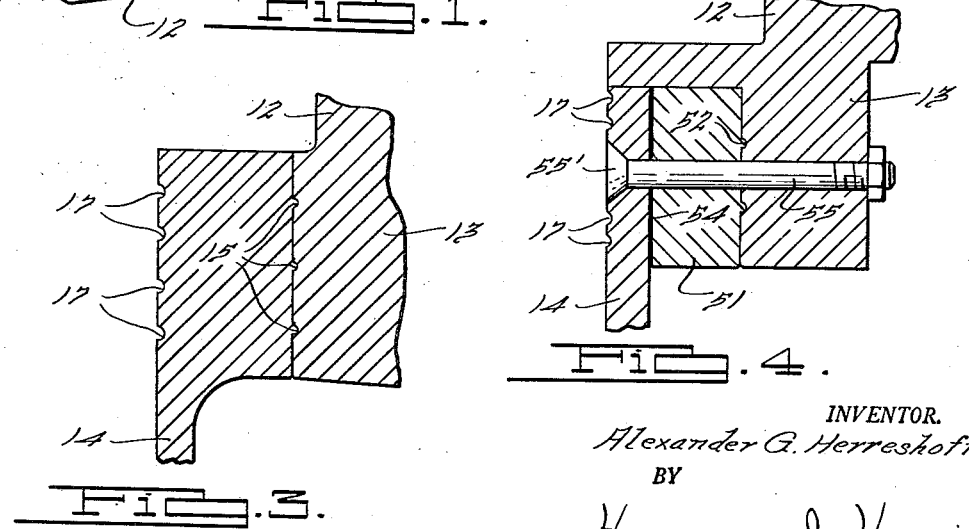
INVENTOR.
Alexander G. Herreshoff
BY
Harness and Harris
ATTORNEYS.

Patented Jan. 1, 1952

2,581,326

UNITED STATES PATENT OFFICE 2,581,326

PISTON

Alexander G. Herreshoff, Grosse Pointe, Mich., assignor to Chrysler Corporation, Highland Park, Mich., a corporation of Delaware Application March 29, 1949, Serial No. 84,081

11 Claims. (Cl. 309—15)

This invention relates to the structural design and the method of manufacture of integrally formed, composite, double-ended pistons adapted for use in double-acting internal combustion engines or the like.

In double acting internal combustion engines, or the like, the crankshaft usually passes transversely through the skirt portions of the double-ended pistons, intermediate the opposed pressure heads thereof, and is connected to the pistons by means of bearing blocks slidably mounted in slideways located interiorly of and carried by the piston structures. In the past it has been common practice to construct pistons of this type from two or more mating sections which are assembled about the crankshaft and connected together by means of tie bolts or the like which are mounted in the walls of the piston skirt portion. A piston of the conventional, built-up, double-ended type is shown in the application of John P. Butterfield, Serial No. 16,645, filed March 24, 1948. When pistons of the double-ended type are formed in separable sections it is necessary to provide relatively thick connecting wall portions in the piston skirt to accommodate the connecting means for the several piston sections. These relatively thick wall portions materially reduce the interior dimensions of the hollow chamber within the piston and consequently reduce the space within which the crankshaft crank arm is adapted to rotate. By reducing the available space within the piston allotted for the crankshaft crank arm, the cross sectional dimension of the crank arm is accordingly reduced and this weakens the crankshaft and makes it less rigid and consequently subject to increased deflection. Deflection of the crankshafts in double action engines causes noise and wear and has been a source of constant trouble. This condition is accentuated in this type of engine due to the fact that the connection of the piston to the crankshaft is frequently located off center from the cylinder axis and this tends to tilt the piston within the cylinder bore. By providing an integrally formed, composite piston with a skirt wall of minimum thickness and maximum stiffness it is possible to increase the area of the hollow chamber within the piston and thus increase the size of the crankshaft crank arm located within the piston and thereby materially increase the rigidity of the engine assembly.

Another objection to the use of double-ended pistons formed from built-up, separable sections is the fact that the various sections are frequently formed such that upon assembly they are not correctly aligned with their mating sections and consequently the misalignment of the various parts has a tendency to create binding of the slidably engaged portions of the piston, cylinder and crankshaft and cause undue wear, noise, and the like, during engine operation.

Furthermore, to machine the various mating piston sections and connecting means for a built-up, sectional piston is a time consuming and costly operation. Obviously the assembly of an engine using built-up, sectional, pistons is considerably more laborious and expensive than an engine using an integrally formed piston wherein the crankshaft can be quickly and easily threaded through the diametrically disposed openings in the piston skirt and then the slideway bearing blocks assembled between the crankshaft and piston slideways.

By forming the double-ended piston as a composite structure, it is possible to select certain materials for the pressure heads and different materials for the skirt portion and consequently the characteristics and dimensions of the piston, both during engine operation and at other times, may be very closely controlled. In the composite piston herein disclosed a lightweight material of good thermal conductivity that has a relatively high coefficient of expansion within the normal engine temperature range and is capable of being easily die cast or machined is preferably selected for the pressure heads. Aluminum and alloys thereof have proven to be particularly advantageous for forming the piston pressure heads. The particular advantages of such a material for the pressure heads are more fully explained hereafter. The skirt portion of this composite piston is preferably formed from a relatively stiff material that is a relatively poor thermal conductor and one that has a relatively low coefficient of expansion when subjected to heat. Such a material should be capable of being cast, extruded, rolled and welded. Steel and the alloys thereof have proven suitable for use as a skirt portion material. The advantages of such a material for the skirt portion of this piston are also more fully set forth subsequently.

It is a primary object of this invention to provide a unitary, composite, double-ended piston designed and constructed in such a manner that it is extremely efficient in operation and simple and economical to manufacture and assemble.

It is a further object of this invention to provide a unitary, composite, double-ended piston which has a minimum skirt wall thickness so as to permit the use of a crankshaft of maximum diameter to thereby increase the rigidity of the crankshaft.

It is an additional object of this invention to provide a unitary, composite, double-ended, internal slideway type of piston formed in such a manner and from such materials that the distance between the opposed slideway faces may be accurately controlled at all times.

It is another object of this invention to provide a composite, unitary, double-ended piston of the type having bearing block slideways supported interiorly thereof wherein the slideways are formed as parts of the pressure heads and disconnected from the piston skirt so as to render the slideways more flexible to thermal expansion and at the same time provide a relatively cool piston skirt that is adapted to be arranged in a cylinder bore with minimum clearance therebetween.

It is a further object of this invention to provide a unitary, composite, double-ended piston formed from relatively simple elements connected together in a simple and novel manner.

Fig. 1 is a side elevation with portions broken away and partly in section, of a unitary, double-ended, internal slideway type of composite piston embodying this invention;

Fig. 2 is a sectional elevation of the piston shown in Fig. 1, the view being taken along the line 2—2 of Fig. 1;

Fig. 3 is an enlarged, fragmentary, sectional elevation of that portion of the piston within the circle identified by the numeral 3 in Fig. 1; and Fig. 4 is a fragmentary sectional elevation of a modification of the skirt and head connection shown in Fig. 3.

In a double-acting type of internal combustion engine a double ended or double-headed type of piston is employed for reciprocatory movement in each cylinder bore, the engine being designed to provide a combustion chamber at each end of each cylinder to cooperate with each end or head of each piston. Engines of this type employ a crankshaft which threads through the skirt portions of the pistons and is directly connected to the pistons without the use of a conventional connecting rod. The connection of the crankshaft to the pistons is by means of bearing blocks journaled on the crankshaft crank pins and slidably engaged with a pair of slideways carried by and supported interiorly of each piston.

A few of the difficulties encountered with engines of this type have been the lack of rigidity in the crankshafts and the inability to maintain sufficiently close clearances between the piston slideways and the crankshaft bearing blocks, and between the pistons and cylinder bores during engine operation so as to keep engine wear, noise and power loss to a minimum. It has been found that with conventional double-headed pistons the combustion heat from the two opposed piston heads is readily transmitted to the piston skirt and to the interior slideways during engine operation and these portions of the piston expand and tend to enlarge the clearances between the bearing block and the slideways with the result that these slidably engaged parts begin to slap and create noise as well as damage to the slidably engaged surfaces. It is thought to be obvious that this problem is more acute in an engine using double-headed pistons than in one using the conventional single headed piston because of the two heated head portions and the reduced cooling areas within the interior of double ended pistons. As the skirt of the double-headed piston is much longer than the slideway supporting struts, the combustion heat will ordinarily cause the skirt to expand more than the struts supporting the slideways therefore its is obvious that the clearances between the crankshaft bearing block and slideways will be opened up during engine operation. Furthermore, if the oppositely disposed ends of the slideways are connected to the piston skirt then any inward axial expansion, longitudinally of the piston, by the slideways, is retarded by the connection of the slideways to the skirt and the situation is even more aggravated for the ends of the slideways are bent towards the piston heads by the heat of combustion and this opens up the slideways. By providing a construction wherein the slideways are disconnected from the skirt portion the skirt runs cooler than would otherwise be the case and the clearances between the piston and surrounding cylinder bore may be set closer and the efficiency of the engine unit improved. This invention overcomes the aforementioned difficulties and provides an improved, low cost, double-ended piston construction that lends itself to accurate control of the piston clearances and at the same time provides a piston that permits use of a stiffer crankshaft to counteract undesirable deflections and vibrations of the crankshaft during engine operation.

The letter A represents a double-ended piston structure having a substantially cylindrical head portion 12 at each end thereof and a slotted, substantially cylindrically shaped, sleeve-like skirt portion 14 extending between and connecting the spaced head portions 12. Each head portion 12 along its peripheral edge is formed with a depending flange portion 13 having a spaced set of circumferentially extending piston ring grooves 16. Extending about the skirt portion 14, adjacent each set of piston ring grooves 16, is a set of grooves 17 adapted to trap oil and provide a series of oil wedges between the piston skirt and the surrounding bore of the engine cylinder in which the piston structure A is mounted.

The piston structure A also has its skirt portion 14 formed with diametrically disposed pairs of axially extending slots 22 and 24 respectively. The slots 22 are displaced circumferentially ninety degrees from the slots 24. Slots 22 are adapted to receive the crankshaft (not shown) which is threaded through the piston skirt so as to extend transversely of the longitudinal axis of the piston. Slots 24 facilitate assembly of the crankshaft bearing block and provide space for the reciprocation of the crankshaft bearing block (not shown herein but disclosed in the application of Arthur J. Slemmons, Serial No. 80,729, filed March 10, 1949) which block is slidably mounted within the piston structure A on the slideways 32. Positioned between the circumferentially spaced slots 22 and 24 of the piston skirt portion 14 are axially extending, integrally formed, pier sections 26 which connect the opposed piston heads 12.

Depending from each piston head 12, interiorly of the piston structure A, is a slideway portion 32. Each slideway portion 32 extends transversely of the longitudinal axis of the piston structure A and is supported from the associated piston head 12 by means of the crossed struts 36 and 38 respectively. Struts 36 are of variable depth and sweep radially outwardly from the slideway 32 towards the associated piston head 12 whereas struts 38 are of full depth throughout the length of the slideway 32 as clearly indicated at 39 of Fig. 1. By this arrangement the heat of the piston head 12 may be readily transferred to the slideway 32 by the struts 36 and 38. It is preferable that the piston head 12 and the slideway supporting struts 36, 38 be formed from material such as aluminum having a relatively high coefficient of expansion within the temperature range of the combustion chamber of the conventional internal combustion engine so that the full benefits of thermal expansion of the struts may be utilized. It will be noted that the ends 33 of the slideway portions 32 extend into the diametrically disposed slots 24 in the piston skirt 14 but are disconnected from the adjacent skirt portion. This arrangement of the struts and slideways prevents transfer of heat from the slideways 32 to the skirt portion 14 and tends to keep the skirt portion relatively cool during engine operation. The piston skirt portion 14 is preferably formed from steel or some alloy thereof which is relatively strong and stiff and has a coefficient of expansion that is considerably less than that of the material used for the pressure heads 12. By having the ends 33 of the slideways 32 disconnected from the piston skirt portion 14 the slideways are rendered more flexible and are free to thermally expand axially of the piston towards the crankshaft bearing block, which is mounted between the slideways. The relatively large thermal expansion of the slideway struts during engine operation, due to combustion heat, and the relatively small piston skirt expansion, resulting from the differences in coefficients of exhaustion and thermal conductivity of the materials used for the piston heads and skirt portion, tends to reduce to a minimum during engine operation the clearances between the slidably engaged crankshaft bearing block and the piston slideways 32 and thus provides a smoothly operating, relatively noiseless engine. While the thermal expansion of the slideway struts 36, 38 reduces the clearances between the crankshaft bearing block and the slideways 32 during engine operation, it is obvious that thermal contraction will open up these clearances and prevent seizure of these elements when the engine is cold or during engine start.

The exposed slide faces 34 of the slideways 32 are preferably cylindrical sections that provide arcuate bearing surfaces facing each other and spaced apart a distance slightly greater than the effective width or diameter of the mating bearing block (not shown) that is journaled on the associated crankshaft (not shown) and slidably associated with the piston slideways 32. The axis of the curved bearing faces 34 of slideways 32 is transversely of and normal to the longitudinal axis of the piston structure A.

The piston skirt portion 14 is connected to the spaced pressure heads 12 by means of a sweated or shrunk connection, see Fig. 3, that takes advantage of the physical properties of the materials from which the piston heads and skirt are formed. The interior surface of each end of the cylindrical piston skirt 14 is formed with a series of radially extending, inwardly directed, projections 15, the projections resembling teeth, serrations, screw threads or the like. The normal outside diameter of the flange portions 13 of the piston heads 12 is slightly greater than the normal interior diameter of the cylindrical piston skirt 14. To assemble the piston heads 12 on the skirt portion 14 the skirt portion 14 is heated to an abnormally high temperature and the piston heads are usually cooled to an abnormally low temperature whereupon diametrical expansion of the piston skirt and contraction of the piston heads will permit these elements to be assembled in telescopic relationship. As the skirt portion is subsequently cooled to its normal temperature the projections 15 thereon bite into the piston head flanges 13 and lockingly connect the heads 12 to the skirt portion 14. As the heads 12 are warmed to their normal temperature they tend to expand and press outwardly against the teeth-like projections 15. It is obvious that both mating elements 12 and 14 may have their temperatures varied to effect the shrunk connection described or either one of these elements may be treated to vary its expansion and/or contraction so as to accomplish the shrunk connection. In place of the shrunk connection a conventional screw thread connection could be used but such would be considerably more expensive to manufacture and assemble than the shrunk connection herein proposed. The shrunk connection also takes advantage of the physical properties of the materials from which the heads 12 and skirt 14 are formed for the steel teeth 15 on the skirt 14 are sufficiently hard to bite into the relatively soft sides of the flanges 13 of the aluminum heads 12.

A modified form of connection between the piston heads 12 and piston skirt portion 14 is shown in Fig. 4. In this form of the invention a fused and/or a bolted or riveted connection between the piston head flange 13 and the surrounding piston skirt portion 14 is disclosed. A ring element 51 of steel or the like is shrunk on the head flange portion 13 and anchored thereto by means of the projections 52 which are similar to the projections 15 shown in Fig. 3. The skirt portion 14 is then connected to the ring element 51 by a suitable fused connection 54 such as by brazing, welding or the like. The ring 51 must be added to the head 12 due to the fact that the steel skirt 14 could not be easily fused to the aluminum head 12. Ring element 51 also acts as a reinforcing means for the end of the skirt associated with the piston head. In the event it is desirable to further strengthen the fused connection 54 then a rivet or bolt 55, having a countersunk head portion 55', may be connected through the skirt portion 14, ring 51 and head flange 13 to more positively associate these elements.

It is thought to be obvious that the unitary, composite, double-ended, internal sliding type of piston herein disclosed is easy and economically fabricated and assembled and at the same time is designed so as to provide a piston unit that is highly efficient in operation due to the piston structure permitting accurate control of all working clearances. The opposed pressure heads 12 are identical and can be simple castings that include the bearing block slideways 32. The skirt portion 14 is a simple sleeve element that can be extruded, cast or rolled and subsequently machined to fine dimensions if necessary. The assembly of the elements of this piston is a novel and relatively simple process that lends itself to current, mass production practices. When assembled in final form this piston unit may be quickly and easily mounted on a unitary crankshaft unit and connected thereto by bearing block means such as that shown in the application of Arthur J. Slemmons, Serial No. 80,729, filed March 10, 1949.

I claim:

1. A composite double-ended piston comprising axially spaced, opposed, substantially cylindrically shaped heads of aluminum or the like and a hollow substantially cylindrical skirt of steel or the like connecting said heads, the means connecting said skirt and said heads including end portions on said skirt arranged to extend concentrically about said heads in contiguous relationship thereto and radially projecting serrations along the skirt end inner surfaces contacting said heads and thermally shrunk into engagement with the adjacent exterior surfaces of said heads so as to embed the skirt serrations in said heads, said heads each including an axially projecting bearing block slideway supported from the interiorly arranged end of the head and positioned to extend transversely of the skirt between opposite sides thereof but to be disconnected therefrom, said slideways being axially spaced apart and adapted to reciprocably receive a bearing block mounted therebetween.

2. A composite double-ended piston comprising a pair of opposed, axially spaced, substantially cylindrically shaped heads formed of a material having a high coefficient of expansion and being of low density, and a hollow, relatively thin walled, substantially cylindrical skirt connecting said heads formed of a material having a low coefficient of expansion and a high modulus of elasticity, said heads each including an axially projecting bearing block slideway supported from the interior end of the head and arranged to extend transversely of the skirt between opposite sides thereof but disconnected therefrom, said slideways being axially spaced apart and adapted to reciprocably receive a bearing block mounted therebetween.

3. A composite double-ended piston comprising a pair of axially spaced, opposed, substantially cylindrically shaped heads formed of aluminum or a material having similar physical properties relating to thermal expansion and contraction, stiffness and wear resistance, and a hollow substantially cylindrical skirt connecting said heads formed of steel or a material having similar physical properties relating to thermal expansion and contraction, stiffness and wear resistance, said heads each having a depending bearing block slideway extending from the interior end thereof and arranged with the slide face thereof extending transversely of the piston skirt between opposite sides thereof but disconnected therefrom, said slideways being axially spaced apart and adapted to reciprocably receive a bearing block mounted therebetween.

4. A unitary, double-ended, composite piston comprising a pair of axially spaced, opposed, substantially cylindrically shaped, piston heads each having a depending, axially extending peripheral flange portion and an axially projecting, transversely extending slideway depending from the inner opposed end surface of each head and extending between diametrically disposed portions of the piston, said slideways being axially spaced to receive a reciprocably mounted bearing block, and a hollow cylindrically shaped, axially slotted, skirt member arranged concentrically about and connected to the flange portions of said piston heads, said skirt portion encircling but being disconnected from the slideways on said piston heads.

5. A unitary, composite double-ended, internal slideway type of piston comprising a pair of spaced, axially aligned, substantially cylindrically shaped, piston heads, formed from a material having a relatively high thermal conductivity and coefficient of expansion, said heads each having a transversely extending, axially projecting slideway supported from the opposed inner end of each head and extending between diametrically disposed portions of the supporting head, and a hollow cylindrically shaped skirt member having axially extending slots therethrough and radially extending, inwardly projecting protuberances formed on the skirt inner walls adjacent each end thereof adapted to be fixedly engaged with encircled portions of the outer walls of the piston heads, said skirt member being formed from material having a relatively low coefficient of expansion and being arranged so as to encircle but be out of contact with said slideways.

6. A unitary, composite, double-ended internal slideway type of piston comprising a pair of axially spaced, axially aligned, substantially cylindrically shaped, piston heads, formed from a material having a relatively high thermal conductivity and coefficient of expansion, said heads each having a transversely extending, axially projecting bearing block slideway supported from the opposed inner end of each head and extending between diametrically disposed portions of the head, and a substantially hollow cylindrically shaped skirt member having axially extending slots therethrough and radially extending, projecting formations on the inner skirt side wall adjacent each end thereof adapted to be fixedly engaged with concentrically arranged portions of the side walls of the piston heads, said skirt member being formed from material having a relatively low coefficient of expansion and being arranged so as to encircle but be out of contact with said slideways.

7. A unitary, composite, double-ended, internal slideway type of piston comprising a pair of axially spaced, axially aligned, substantially cylindrically shaped, piston heads, formed from a material having a relatively high thermal conductivity and coefficient of expansion, said heads each having a transversely extending, axially projecting bearing block slideway supported from the opposed end of each head and extending between diametrically disposed portions of the head, a ring-like member mounted on each head so as to extend concentrically about a side portion of each head, and a hollow, substantially cylindrically shaped skirt member having axially extending slots therethrough and the ends thereof connected to and extending concentrically about the ring-like members, said skirt member being formed from material having a relatively low coefficient of expansion and being arranged so as to encircle but be out of contact with said slideways.

8. A unitary, composite, double-ended, internal slideway type of piston comprising a pair of axially spaced, axially aligned, substantially cylindrically shaped, piston heads, formed from a material having a relatively high thermal conductivity and coefficient of expansion, said heads each having an axially extending peripheral flange portion and a transversely extending, axially projecting bearing block slideway supported from the opposed inner end of each head and extending between diametrically disposed portions of the head, said slideways each having a bearing surface curved about an axis extending transversely of and normal to the piston axis, and a hollow, substantially cylindrically shaped skirt member having axially extending slots therethrough and radially extending, inwardly projecting protuberances formed on the inner skirt wall adjacent each end thereof adapted to be engaged with the concentrically disposed walls of the flanges on the piston heads, said skirt member being formed from a material having a relatively low coefficient of expansion and being arranged so as to encircle but be out of contact with said slideways.

9. A double-ended piston comprising a pair of axially aligned and axially spaced, substantially cylindrically shaped, head portions connected together by a concentrically arranged, hollow, substantially cylindrically shaped skirt portion, said head portions each having a bearing block slideway projecting from the inner side of the head portion arranged to extend transversely of the piston skirt portion between diametrically disposed portions thereof but disconnected therefrom, the bearing surfaces of said slideways being axially spaced apart and aligned to reciprocably receive therebetween a bearing block.

10. A double-ended piston comprising a pair of axially aligned and axially spaced, substantially cylindrically shaped, head portions connected together by a concentrically arranged, hollow, substantially cylindrically shaped skirt portion, said head portions each having a bearing block slideway projecting from the inner side of the head portion arranged to extend transversely of the piston skirt portion between diametrically disposed portions thereof but disconnected therefrom, the bearing surfaces of said slideways being axially spaced apart and aligned to reciprocably receive therebetween a bearing block, and said hollow skirt portion having axially extending slots therethrough disposed at substantially right angles to the direction of the slideways adapted to receive a crank member.

11. A double-ended piston comprising a pair of axially aligned and axially spaced, substantially cylindrically shaped, head portions connected together by a concentrically arranged, hollow, substantially cylindrically shaped skirt portion, said head portions each having a bearing block slideway projecting from the inner side of the head portion arranged to extend transversely of the piston skirt portion between diametrically disposed portions thereof but disconnected therefrom, the bearing surfaces of said slideways being axially spaced apart and aligned to reciprocably receive therebetween a bearing block, and said hollow skirt portion having axially extending slots therethrough disposed at substantially right angles to the direction of the slideways adapted to receive a crank member, said hollow skirt portion having other axially extending slots therethrough displaced substantially ninety degrees from said first mentioned slots and aligned with said slideways.

ALEXANDER G. HERRESHOFF.

REFERENCES CITED

The following references are of record in the file of this patent:

UNITED STATES PATENTS

| Number | Name | Date |
|---|---|---|
| 706,711 | Andres | Aug. 12, 1902 |
| 750,565 | Austin | Jan. 26, 1904 |
| 1,254,353 | Priest | Jan. 22, 1918 |
| 1,357,851 | Diamond | Nov. 2, 1920 |
| 1,427,673 | Allen | Aug. 29, 1922 |
| 1,427,930 | Baker | Sept. 5, 1922 |
| 1,721,197 | Almen | July 16, 1929 |
| 1,933,749 | Murray | Nov. 7, 1933 |
| 1,978,045 | Flower | Oct. 23, 1934 |
| 2,174,218 | Greene | Sept. 26, 1939 |
| 2,267,339 | Paulsen | Dec. 23, 1941 |
| 2,270,278 | Dunn | Jan. 20, 1942 |